July 10, 1956 J. M. BRADY 2,753,715
INDICATING INSTRUMENT
Filed May 3, 1951 2 Sheets-Sheet 1

INVENTORS
JAMES M. BRADY
BY Harry M. Saragovitz
Attorney

United States Patent Office 2,753,715
Patented July 10, 1956

2,753,715

INDICATING INSTRUMENT

James M. Brady, Santa Barbara, Calif., assignor to the United States of America as represented by the Secretary of the Army Application May 3, 1951, Serial No. 224,433

7 Claims. (Cl. 73—363)

(Granted under Title 35, U. S. Code (1952), sec. 266)

The invention described herein may be manufactured and used by or for the Government for governmental purposes, without the payment of any royalty thereon.

The present invention relates to measuring and indicating devices.

In various types of measuring apparatus, and particularly in meteorological instruments, the problem of measuring small quantities with suitable accuracy often arises.

It is, therefore, an object of the present invention to provide a mechanism for accurately measuring small quantities or movements.

It is another object to provide such a mechanism having no inherent friction which may interfere with the sensitivity of the mechanism and impede its operation.

It is a further object to provide such a device which is well adapted for indicating extremely rapid and minute changes in temperature.

It is still another object to provide a device which is capable of accurately measuring slight pressure differentials.

In Patent 2,564,669 issued August 21, 1951, for "Pressure Measuring Device" in the name of James M. Brady, there was described a bifilar system wherein the ends of two threadlike elements are maintained in spaced relationship and one end of the system is secured against rotation about the axis of the system, but is free to move a limited distance along said axis, and the other end thereof is secured against axial movement, but is free to rotate about said axis. There is also provided a suitable spring means to urge the rotatable end of the bifilar system into rotation in one sense of direction and maintain a taut relationship between the parts.

The present invention is based upon the discovery that sensitive and more accurate indications can be obtained by using a pair of wires affixed to a common rung and held in tension by spring means or weight, wherein each wire possesses different physical characteristics, and as the length of one wire is altered by thermal, hygroscopic or atmospheric action, the position of the rung will be changed, which change or movement can be readily translated on an appropriate pointer and scale to make the desired reading.

The said mechanism, or variations of it, have innumerable applications. As illustrated in the drawings (Fig. 1) such wires may extend along the four possible paths from two substantially fixed points to two points on the movable rung. The two fixed points and the two points on the rung would be substantially symmetrical to the rotational axis. Any two wires to the same point are referred to as a "pair," of which there are four possibilities since each wire may be considered in two possible pairs while any two wires not to a common point are referred to as a "doublet," of which there are two possibilities. Another way of defining the relative positions of the wires is by their relation to imaginary helices about the axis; such helices would have a very long pitch, greater than the distance between rungs for each 360° rotation of the helix, and would be tangent to the wires at the nearest point of such wires to the axis. Midway between the limits the helices would be of equal radius and equal but opposite pitch, but in the limiting positions, where the wires might touch at the axis the helices would approach zero radius, and where the wires become parallel the helices would approach infinite pitch. This terminology is merely to simplify description. Such a system may be used in measuring temperature differences, as a thermometer wherein one end of the system is secured to the upper part of a frame and the other end of the system to a rung whose position will be altered due to change in length of one doublet of the bifilar wires relative to the other doublet. As further illustrated (Fig. 3), the system may be utilized to measure atmospheric pressures by securing one doublet of the bifilar wires to the diaphragm of a bellows whereby movement of the bellows due to pressure differentials will alter the position of a rung at the opposite end of the system, which movement can be imparted to a pointer and read on a scale.

The invention can best be understood from the following description to be read in view of the accompanying drawings, in which.

Figures 1, 2:
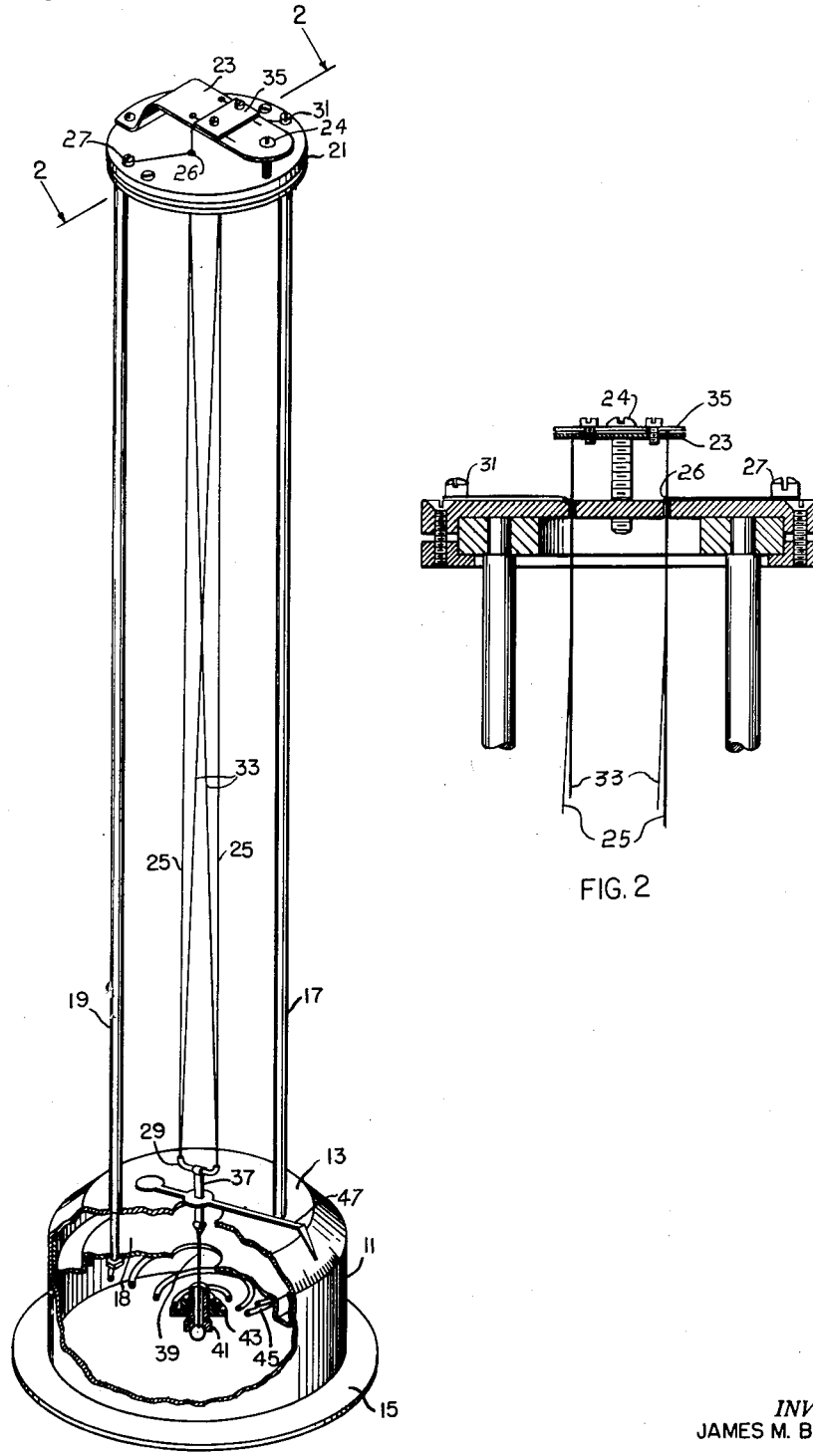
Fig. 1 is a perspective view of a thermometer, embodying the invention, with certain parts broken away to show details of construction.
Fig. 2 is a view in cross section taken on the line 2—2 of Fig. 1 of the upper rung support of the thermometer shown in Fig. 1, and, Fig. 3 is a perspective view of another embodiment of the invention as applied to a barometer (with certain parts broken away to show details of construction).

Referring particularly to Fig. 1, of the drawing, there is shown a casing 11, comprising a substantially circular shaped canister having a cover 13 and side walls 15 and provided with an internal rigid supporting plate 18. Positioned through the cover 13, are a pair of posts 17 and 19, which extend through the plate 18 and are secured to the underside thereof. By this means, posts 17 and 19 are securely and rigidly held in position. At the extreme end, that is, at the end remote from the casing 11, the posts 17 and 19 support a plate 21 which is firmly secured to said posts. Fixed to the upper surface of said plate 21 is a flat metallic spring 23, one end of which is secured to the plate 21 by screws or the like and the other end having an adjustable range setting screw 24, the function and operation of which will hereinafter be described.

The bifilar wires of the system, in this particular instance, the thermometer of Fig. 1, are positioned in the following manner. A wire of one material 25 is secured on the top surface of the plate 21 by screw 27 on said plate. The wire 25 extends through an opening 26 in plate 21 and is threaded through a horizontally disposed tubular rung 29 and extends upwardly through another opening 28 in the plate 21 where it is tied or secured to another screw 31. A wire of another material 33 is secured at one end between a bar 35 and the spring 23 and extends through an opening 26 in plate 21, and is threaded through the rung 29 and thence through the other opening 28 of plate 21, where it is securely held between the spring 23 and bar 35. In the particular embodiment shown herein, one of the wires is made of .005 inch stainless steel, while the other of said wires is of a material having a coefficient of expansion different from that of the stainless steel such as .005 inch "Nilvar." While in this embodiment particular kinds of wires have been indicated, it is obvious that any two wires of different coefficients of expansion can be used.

The tubular rung 29 is carried by a flat metal strap 37, which in turn is affixed to a tensioning wire 39. Wire 39 terminates in a screw threaded cylindrical block 41 having a threaded flange 43 which engages a spiral spring 45, the last turns of which press firmly against the side walls 15 of the casing 11.

Also supported by the metal strap 37 and revolvable therewith, is a pointer or index 47 which in conjunction with scaled readings on the beveled surface of casing 11 serves as a means for indicating temperature readings.

In operation, the bifilar wires are brought into appropriate tension, dependent upon the range of temperature indication desired, by adjustment of the range setting screw 24. Such adjustments can be made by manipulation of the screw 24. Thereafter, upon any variation in temperature, the length of one doublet of the bifilar wires will be altered to a degree greater than that of the other doublet of wires due to the differences of thermal expansion of the separate wires. Upon such change in length, the rotational position of the rung 29 will be altered and carry with it the pointer 47 which will show the temperature reading as indicated on the scale. In further explanation of the functioning of the device, the following may be pointed out. Looking at the device of Fig. 1, and particularly to the one pair of wires meeting at the common terminal at the right side of the rung 29, the invention resides basically in a system utilizing two wires 25 and 33 which are differently responsive to a particular atmospheric or meteorological condition. One end of the wire 25 is secured to the plate 21 while its other end is held at the end of the rung as pointed out hereafter. The other wire 33 is likewise held at the end of the rung 29 while the other end is held securely between spring 23 and bar 35. As the upper end of the wire 33 is raised or lowered by manipulation of the adjustment screw 24, the rotational movement of the rung 29 will be affected to achieve a desired null position. The strap 37 and its associated tensioning wire 39 and spring 45 serve primarily to hold the wires 25, 33 taut. Thereafter upon a change in atmospheric condition, the length of one of said wires will be altered, either longer or shorter, relative to the other wire thereby effecting a rotational movement of the rung 29 which movement can be translated to an indicating device. In the specific embodiment shown in Fig. 1 two such pairs of wires are utilized to produce a device that is in equilibrium without any frictional points.

Figure 3:
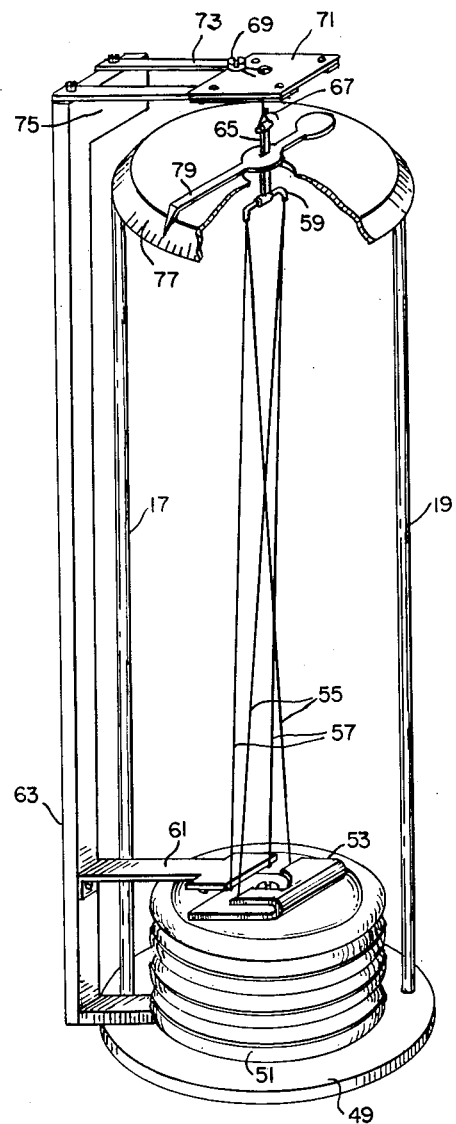

In the embodiment of Fig. 3, there is shown a device embodying the principles of the subject invention for making rapid and extremely sensitive determinations of pressure. The device comprises essentially a base plate 49, upon which is secured, in an opening in said base, a pressure responsive bellows, such as an aneroid cell 51. The aneroid cell 51 is provided with a stiff horizontally disposed diaphragm forming the top of the cell, and which has secured thereto a small angle iron 53. The vertically disposed portion of the angle iron 53 serves as an anchoring means or rung for the ends of wires 55. Wires 57 are fastened to an arm 61 which extends from a column 63 which is secured to the base, said arm 61 being preferably positioned slightly above the cell 51. Both wires 55, 57 extend through a horizontally disposed tubular rung 59.

The tubular rung 59 is carried or supported by a flat metal strap 65, which in turn is linked with one end of a tension wire 67. The other end of the tension wire 67 is held securely by a screw 69 in a plate 71 which is supported by a pair of spring metal arms 73, which are secured to the column 63 by means of a bracket 75. Slightly below the arms 73 is a scale plate 77 provided with an appropriate scale. A pointer 79 is provided which is mounted on the flat metal strap 65 and is revolvable therewith.

If it is desired to shorten or lengthen the wires 55, 57, or take up any slack therein, the screw in the base of the aneroid cell 51, which is common to such cells, may be used to make axial adjustments. In operation, as variations in atmospheric pressure occur, movement of the cell 51 will be effected, whereby the length of one doublet of wires will be altered to a degree greater than that of the other doublet of wires, thereby altering the position of the rung 59. Such displacement of the rung will carry the pointer 79 over the scale, enabling one to take the pressure reading.

While there have been shown in the drawings and described in detail above two particular embodiments of the invention, it will be understood that it is not thereby intended to limit the invention to the specific applications disclosed, but it is aimed to cover all modifications and alternative constructions falling within the scope of the invention as defined by the claims. Thus, for example, a plurality of wires may be coupled together in series where even more sensitive and precise indicating measurements are required, as is shown in Fig. 5 of the Brady patent, referred to above.

For particular usages, varying doublets of bifilar wires of different materials may be utilized wherein such doublets of wires will be affected by physical phenomena. Thus, for example, a device similar to the ones heretofore described wherein one doublet of wire elements are composed of a staple element and one doublet of a sensitive material may be utilized to function as a hygrometer for determining moisture content of the atmosphere. Also, in lieu of the single wires joined at one rung and looped through a tubular rung and back to the first rung as shown in Fig. 1, four separate shorter wires, comprising two dissimilar doublets of wires as regards their physical characteristics, may be joined individually to the two rungs as by soldering or the like. The term "filament" or "thread" is used herein to identify each straight section of wire extending generally along the axis, whether or not a continuous wire is used to form more than one such filament.

Having thus described the invention, what is claimed is:

1. A pressure measuring device comprising a U shaped framework, the axis of the device extending between the arms of said framework, a pressure responsive cell secured to a first arm of said framework and variable in an axial direction with variations in pressure, a rung proximate to a second arm of said framework, positioned in a plane perpendicular to said axis, a pair of threads extending from each end of said rung, one thread of each pair extending to spaced points on said cell, and the other thread of each pair extending to mutually opposite points on a fixed part of said framework, a tie member extending axially from said rung to said second arm, an indicating pointer secured to said tie and rotatable with the rung about said axis, and means associated with said second arm to urge the tie member in an axial direction to maintain tautness in the tie member and threads.

2. An indicating device comprising a fixed rung positioned in a substantially horizontal plane, and a movable rung spaced from said fixed rung and in another substantially horizontal plane, said movable rung having an indicating means and being rotatable about an axis which is substntially perpendicular to said planes, two filaments having different changes in length responsive to changes in particular phenomena, one end of each of said filaments being attached to the fixed rung in spaced relation to each other, the other ends of said filaments terminating in a substantially common juncture point on the movable rung and spaced from said axis whereby said filaments are disposed substantially colinear with said axis, means for normally maintaining the movable rung in said parallel plane with said fixed rung and tensioning means directed colinearly of said axis for resiliently holding said movable rung against substantial movement along said axis whereby relative changes in length of said filaments resulting from a change in physical phenomena effect movement of the movable rung about said axis.

3. An indicating device comprising a fixed rung positioned in a substantially horizontal plane and a movable rung spaced from said fixed rung in another substantially horizontal plane, said movable rung having indicating means operatively associated therewith and being rotatable about an axis which is substantially perpendicular to said horizontal planes, first and second pairs of filaments, each of said pairs consisting of correspondingly discrete filaments which have different changes in length responsive to changes in particular physical phenomena, one end of each of the filaments of said first pair being attached to the fixed rung in spaced relation to each other, the other end of said first pair of filaments terminating in a first substantially common juncture point on the movable rung and spaced from said axis whereby said filaments are disposed substantially colinearly with said axis, the ends of each of said filaments of said second pair being attached to a second common juncture point on said movable rung, the other ends of said second pair of filaments being attached to the fixed rung in spaced relation to each other, and said second pair of filaments tending to rotate in the same general direction of rotation as the first pair and serving as means for maintaining said movable rung in substantially parallel plane with said fixed rung, and tensioning means directed colinearly to said axis for resiliently holding said movable rung against movement along said axis, whereby relative changes in length of said filaments resulting from a change in physical phenomena effect movement of said movable rung.

4. A device responsive to changes in physical phenomena comprising a first substantially horizontally disposed member rotatable about an axis and having portions extending to radially opposite positions relative to the axis, indicating means operatively associated with said first member, a second fixed member spaced from and in substantially parallel plane with said first member, a pressure responsive element closely spaced from and in substantially parallel plane with said second member, a first filament extending from a first point on one of said radially opposite positions to a first point on said pressure responsive device, a second filament extending from a second point on the other of said radially opposite positions to a second point on said pressure responsive device, a third filament extending from said first point on said first radially opposite position to a first point on said fixed member adjacent to said second point on said pressure responsive element, a fourth filament extending from said second point on said other radially opposite portion extending to a second point on said fixed member adjacent to said first point on said pressure responsive element, and tensioning means directed colinearly of said axis for resiliently holding said first horizontally disposed member against substantial movement along said axis whereby upon a change in pressure the tension on said filaments extending between said first member and pressure responsive device is varied imparting a rotary motion to said first member.

5. An indicating device comprising a first member rotatable about an axis, a second member, means to indicate the degree of relative rotation of said first and second members, four filaments extending generally along said axis from each of two points on said first member substantially symmetrically spaced from said axis substantially to each of two points on said second member also substantially symmetrically spaced from said axis remote from said points on said first member, said four filaments comprising two mutually exclusive doublets in which both ends of each filament extend to separate points and forming four mutually inclusive pairs made up of one filament from each of said doublets extending to a common point on either member, and means to maintain said filaments taut, the effective length of one doublet of filaments between said points being modified relative to that of the other doublet of filaments by a variable condition to be indicated, whereby said condition determines the relative lengths and the relative rotation of said first and second members.

6. An indicating device comprising a first member rotatable about an axis, a second member, means to indicate the degree of relative rotation of said first and second members, a pair of filaments extending generally along said axis from a point on said first member spaced from said axis to each of two points on said second member spaced substantially symmetrically about said axis remote from said point on said first member, and means to maintain said filaments taut, the effective length of one filament between said points being modified relative to the corresponding length of the other filament by a variable condition to be indicated, whereby said condition determines the relative length and the relative rotation of said first and second members.

7. An indicating device comprising a first member rotatable about an axis, a second member, means to indicate the degree of relative rotation of said first and second members, a pair of filaments extending generally along said axis from said first member to said second member, said filaments extending from points spaced from said axis on both members and in a direction tangent to two helices of opposite long pitch about said axis, and means to maintain said filaments taut, the effective length of one filament between said members being modified relative to that of the other filament by a variable condition to be indicated, whereby said condition determines the relative length and the relative rotation of said first and second members.

References Cited in the file of this patent

UNITED STATES PATENTS

| 2,560,651 | Kutzler | July 17, 1951 |

FOREIGN PATENTS

| 11,656 | Switzerland | Dec. 31, 1895 |
| 12,329 | Great Britain | May 28, 1903 |
| 495,550 | France | July 4, 1919 |
| 649,254 | Germany | Aug. 19, 1937 |